US010002261B2

(12) United States Patent
Janke et al.

(10) Patent No.: US 10,002,261 B2
(45) Date of Patent: Jun. 19, 2018

(54) INPUT/OUTPUT MODULE, DATA PROCESSING APPARATUS AND METHOD FOR CHECKING THE OPERATION OF A DATA PROCESSING APPARATUS

(71) Applicant: Infineon Technologies AG, Neubiberg (DE)

(72) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 524 days.

(21) Appl. No.: 14/034,703

(22) Filed: Sep. 24, 2013

(65) Prior Publication Data

US 2014/0090092 A1   Mar. 27, 2014

(30) Foreign Application Priority Data

Sep. 24, 2012   (DE) .................... 10 2012 108 981

(51) Int. Cl.
*G06F 21/64* (2013.01)
*H04L 9/32* (2006.01)
*G06F 21/72* (2013.01)

(52) U.S. Cl.
CPC .............. *G06F 21/64* (2013.01); *G06F 21/72* (2013.01); *H04L 9/3247* (2013.01); *G06F 2221/2101* (2013.01)

(58) Field of Classification Search
CPC ....... H04L 9/3247; G06F 21/64; G06F 21/77; G06F 21/79; H03M 13/09; G06K 19/07372
See application file for complete search history.

(56) References Cited

U.S. PATENT DOCUMENTS

| 5,883,956 | A  | * | 3/1999  | Le ...................... G06F 21/572 380/52 |
| 6,931,576 | B2 |   | 8/2005  | Morrison et al. |
| 7,360,240 | B2 | * | 4/2008  | King .................. G06K 13/085 380/258 |
| 8,359,481 | B2 | * | 1/2013  | Bancel .................. G06F 11/28 713/172 |
| 8,732,860 | B2 |   | 5/2014  | Marron |
| 8,918,679 | B2 | * | 12/2014 | Janke .................. G06F 11/2215 714/23 |
| 2003/0140236 | A1 | | 7/2003 | Mueller |

(Continued)

FOREIGN PATENT DOCUMENTS

| EP | 2336931 A1 | 6/2011 |
| FR | 2978268 A1 | 1/2013 |
| FR | 2979442 A1 | 3/2013 |

*Primary Examiner* — Eleni A Shiferaw
*Assistant Examiner* — Alexander R Lapian
(74) *Attorney, Agent, or Firm* — Viering Jentschura & Partner MBB

(57) ABSTRACT

Various embodiments provide an input/output module, including: at least one input/output port for the input of data; a signature generator that is coupled to the input/output port and is set up to generate a signature for the data from the data; a reference input, wherein the reference input is set up for the application of a reference signature; and a comparator that is coupled to the signature generator and to the reference input, and is set up to output an alarm signal if the signature of the data on the input/output port differs from the reference signature.

21 Claims, 1 Drawing Sheet

(56) References Cited

U.S. PATENT DOCUMENTS

Figure 1:
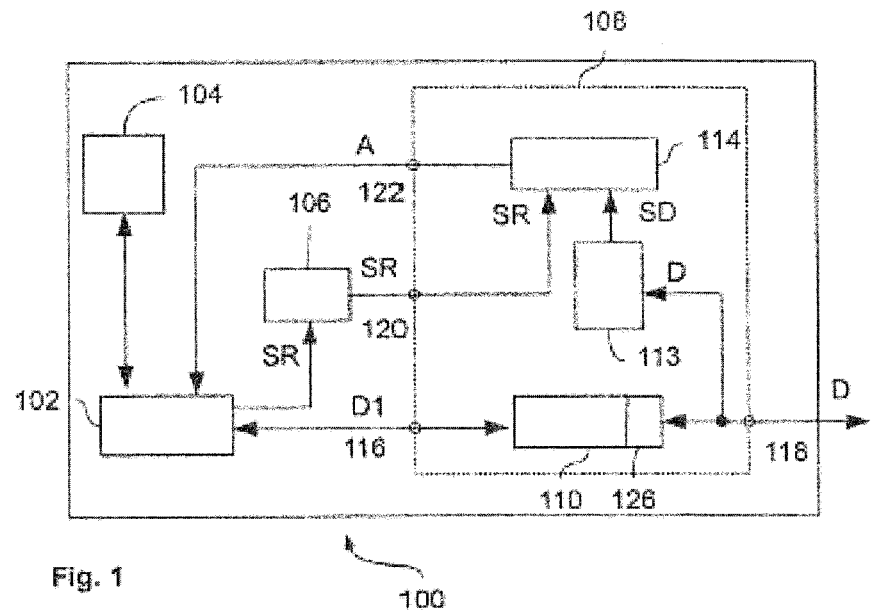

| | | | |
|---|---|---|---|
| 2005/0066245 A1* | 3/2005 | Von Wendorff | G06F 11/1008 714/732 |
| 2007/0174622 A1* | 7/2007 | Romain | G06F 21/52 713/176 |
| 2007/0226551 A1* | 9/2007 | Janke | G06F 11/1004 714/703 |
| 2010/0023747 A1* | 1/2010 | Asnaashari | G06F 21/34 713/150 |
| 2011/0126085 A1* | 5/2011 | Teglia | G06F 21/52 714/819 |
| 2013/0024938 A1 | 1/2013 | Marron | |
| 2013/0055025 A1* | 2/2013 | Feix | G06F 21/554 714/32 |
| 2013/0212407 A1* | 8/2013 | Walton | G06F 21/72 713/190 |

\* cited by examiner

INPUT/OUTPUT MODULE, DATA PROCESSING APPARATUS AND METHOD FOR CHECKING THE OPERATION OF A DATA PROCESSING APPARATUS

CROSS-REFERENCE TO RELATED APPLICATION

This application claims priority to German Patent Application Serial No. 10 2012 108 981.7, which was filed Sep. 24, 2012, and is incorporated herein by reference in its entirety.

TECHNICAL FIELD

Various embodiments relate to an input/output module that can be used in data processing apparatuses, for example in security microcontrollers or smartcards. Various embodiments further relate to a method for checking the operation of such a data processing apparatus.

BACKGROUND

Many attacks against security microcontrollers have the aim of influencing the output of data such that not just permitted data but also other memory contents, such as secret keys or protected program code; are output. In order to achieve what is known as a "dump", it is possible to manipulate the CPU or a peripheral controller, for example.

In order to counteract attacks, it is possible to provide sensors that can be used to detect the attack conditions. The security microcontroller can then be put into a safe state, for example in which the output of the data is interrupted, in good time. The sensors can for the most part be bypassed by improved attacks, however.

The executing modules or circuit portions of the security microcontroller can also be embodied on a redundant basis in order to detect manipulations on one of the portions during operation. When a manipulation is recognized, the security microcontroller can be put back into a safe state in good time. However, modern and future security microcontrollers have very many components involved in the data transmission. Every single component would need to be stored redundantly in order to safeguard the overall security of the product.

SUMMARY

Various embodiments provide an input/output module, including: at least one input/output port for the input of data; a signature generator that is coupled to the input/output port and is set up to generate a signature for the data from the data; a reference input, wherein the reference input is set up for the application of a reference signature; and a comparator that is coupled to the signature generator and to the reference input, and is set up to output an alarm signal if the signature of the data on the input/output port differs from the reference signature.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a first embodiment of a data processing apparatus; and

FIG. 2 shows a second embodiment of a data processing apparatus.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the detailed description which follows, reference is made to the appended figures, which form part of the description and which show specific embodiments in which the invention can be executed for the purpose of illustration. In this respect, directional terminology such as "at the top", "at the bottom", "at the front", "at the rear", "front", "rear" etc. is used with reference to the orientation of the figure(s) described. Since components of embodiments can be positioned in a number of different orientations, the directional terminology is used for the purpose of illustration and is in no way restrictive. It goes without saying that other embodiments can be used and structural or logical changes made without departing from the scope of protection of the present invention. It goes without saying that the features of the various exemplary embodiments described herein can be combined with one another unless specifically stated otherwise. The following detailed description should therefore not be regarded as restrictive, and the scope of protection of the present invention is defined by the attached claims.

Within the context of this description, the terms "connected" and "coupled" are used to describe both direct and indirect connection, and also direct and indirect coupling.

In the figures, identical or similar elements are provided with identical reference symbols, insofar as this is expedient. For the sake of clarity, it is not possible to provide all elements in the figures with dedicated reference symbols. This applies particularly to elements that are identical to other elements. The description and reference symbols can thus apply in the same way to all elements that are shown in the same graphical manner.

FIG. 1 shows a first embodiment of a data processing apparatus 100. The data processing apparatus 100 may be arranged in a card body, for example, and may form a smart card or chip card, for example. The data processing apparatus 100 may have a processor 102, a program memory 104, a reference signature memory 106 and an input/output module 108. The processor 102 may be a security microprocessor (security controller) that is protected against attacks. By way of example, sensors for recognizing attacks can be provided or measures can be taken that make it difficult to spy out or manipulate data or commands. The processor 102 may be coupled to the program memory 104. The program memory 104 may store programs and/or data that are executed by the processor 102. The processor 102 can provide or receive data and/or commands D1 on a port. The data D1 can be used for the data processing apparatus 100 to communicate with the outside world.

The input/output module 108 may have a data port 116, an input/output port 118, a reference input 120 and an alarm output 122. It may have an interface module 110, a signature generator 113 and a comparator 114. The data port 116 may be coupled to the port of the processor 102 on which the data and/or commands D1 are provided or received by the processor 102. The input/output port 118 may have data D on it. The data D may be data or commands that are output by the input/output module 108, or the data processing apparatus 100. The data D may also be data or commands that are input into the input/output module 108, or into the data processing apparatus 100. The data D can be used for the data processing apparatus 100 to communicate with the outside world.

The reference input 120 can have a reference signature SR applied to it. The reference input 120 may be coupled to a memory 106, subsequently called "reference signature memory 106". The reference signature memory 106 may store a reference signature SR. The reference input 120 may be coupled to the processor 102. The processor 102 can calculate the reference signature SR. The reference signature memory 106 may be part of the processor 102.

The alarm output 122 may be coupled to the processor 102. An alarm A may be forwarded to the processor 102. In the event of an alarm signal A, the processor 102 may take suitable measures against the attack.

The signature generator 113 may be coupled to the input/output port 118. It may take data D that are applied to the input/output 118 and generate a signature SD for the data D, subsequently called "data signature SD".

The signature may be an algorithm that maps a volume of data of arbitrary magnitude onto a smaller volume of data of fixed magnitude, as a result of which an alteration in the volume of data of arbitrary magnitude has a very high likelihood of also altering the smaller volume of data. The algorithm may be chosen such that the calculation of the smaller volume of data from the volume of data of arbitrary magnitude is simple to perform. The algorithm may also be chosen such that it is almost impossible to generate a volume of data of arbitrary magnitude for a prescribed smaller volume of data. It may also be chosen such that it is almost impossible to alter the volume of data of arbitrary magnitude without simultaneously altering the smaller volume of data. It may also be chosen such that it is almost impossible to specify two volumes of data of arbitrary magnitude that result in the same smaller volume of data. By way of example, the signatures may be checksums that are produced by a hash function, for example.

The comparator 114 may be coupled to the signature generator 113 and to the reference input 120, as a result of which it can be supplied with the data signature SD and with the reference signature SR. The comparator 114 can output an alarm signal A on the alarm output 122 if the data signature SD differs from the reference signature SR.

The interface module 110 may be coupled to the input/output port 118. It may be coupled to the data port 116, for example via the data port 116. It may be coupled to the processor 102. The interface module 110 can condition the data D1 that are present on the data port 116 of the input/output module 108 for transmission outside the data processing apparatus 100. Similarly, the data D that are supplied to the data processing apparatus 100 from the outside may be conditioned for transmission to the processor 112 or for other further processing. The interface module 110 may have an input/output memory or data buffer 126. the input/output memory 126 may be coupled to the input/output port 118.

The interface module 110 may be a contactless interface. The contactless interface may comply with Standard ISO 14443.

The interface module 110 may be a universal asynchronous receiver transmitter (UART). A universal asynchronous receiver transmitter is used for asynchronously sending and receiving data via a data line. A clock signal is not required. The data to be transmitted or the data to be received are delivered to the UART usually in parallel form, for example via a parallel data bus.

The interface module 110 may be an $I^2C$ bus (inter-integrated circuit). The $I^2C$ bus is a serial master-slave data bus. It may be used internally in the device for communication between different circuit portions, e.g. of a processor 102. The $I^2C$ protocol may be used in the chip card domain, for example in a health insurance card, in order to read or write to the chip card using a card reader.

The interface module 110 may be a serial peripheral interface (SPI). The serial peripheral interface is a bus system for a synchronous serial data bus in which digital circuits can be connected to one another via three common lines on the basis of the master-slave principle. By way of example, it can be used for transmitting data between microcontrollers.

The interface module 110 may be a single wire protocol (SWP) interface. The single wire protocol is a specification that can be used to set up a connection between a SIM card and a near field communication chip (NFC) in a mobile telephone, for example.

The operation of the data processing apparatus 100 can be checked by calculating a data signature SD for data D that are output on an input/output port 118 by the data processing apparatus 100. The data signature SD can be compared with the associated reference signature SR. The reference signature SR may be calculated beforehand. It may be firmly prescribed. It may be a signature pertaining to data that are permitted and required to be output via the input/output port 118. The data may be called "reference data R". Instead of one reference signature, a plurality of reference signatures SR may be used, calculated or stored.

If the data that are intended to be output on the input/output port 118 have been manipulated in any way on the path to output, for example by virtue of their content having been altered, or fewer or more data being output, or output of the data not being admissible or permitted, the data signature SD differs from the reference signature SR. An alarm signal A may be output at the alarm output 122, and the processor 102 may be notified that an attack or an error has occurred. The processor 102 may then take the necessary action, for example may terminate the data output on the input/output port 118 or put the data processing apparatus 100 into a safe state. Sensitive data, for example secret keys, may be erased in order to prevent them from being output.

The data processing apparatus 100 may be set up such that the data D are output to the input/output port 118 only if the data signature SD of the data D matches the reference signature SR. The data D may be buffer-stored in the input/output memory 126 during the calculation of the data signature SD and the comparison before they are output on the input/output port 118. Alternatively, data packets may be output directly on the input/output port 118, the data signature SD being calculated using the data packet applied to the input/output port 118 and, in the event of an attack or error, only the output of the next data packet being prevented.

Similarly, the operation of the data processing apparatus 100 may be checked when data D are input into the data processing apparatus 100. In this case, the data D may be data, parameters or commands, for example, that are intended to be processed further or executed by the processor 102 or the data processing apparatus 100.

The reference signature SR may in this case be a signature pertaining to a parameter, a parameter sequence, a command or a command sequence that is permitted to input via the input/output port 118, i.e. that, when processed further or executed, does not adversely affect the security or functionality of the data processing apparatus 100, for example as a result of data being output that are confidential. The reference signature SR may be calculated beforehand or may be fixed. It may be stored in the reference signature memory 106. It is also possible to calculate and store a multiplicity of reference signatures SR for different parameters, commands, commands with parameters, command sequences or command sequences with parameters that are permitted to be executed.

If the data signature SD corresponds to one of the stored reference signatures SR, the processor 102 may execute the data D or process them further. If the data signature SD does not correspond to one of the stored reference signatures SR, an alarm signal A may be output. The input of data D on the input/output port 118 to the data processing apparatus may be terminated. The data processing apparatus 100 may be transferred to a safe state. The processor 102 may be prohibited from executing further commands. Sensitive data, particularly from secret keys that are stored in the data processing apparatus 100, can be erased.

On account of the large amount of possible data, parameters, commands, commands with parameters, command sequences or command sequences with parameters that are permitted and that are stored in the reference signature memory 106, it may be advantageous for the reference signature SR to be calculated in real time by the processor 102. By way of example, for a state that the processor 102 is in, it may be possible for a certain type of command that is present on the input/output port 118 to be admissible. The processor 102 may calculate one or more reference signatures SR for data or commands that are admissible or that are permitted to be executed. The reference signature SR may be calculated while data D are present on the input/output port 118. In particular, some of the data D, for example the type of command or the number of parameters, may be included in the calculation of the reference signature SR too.

The data processing apparatus 100 may be set up such that the data D or commands that are present on the input/output port 118 are forwarded to the data processing apparatus 100, for example to the processor 102, by the input/output port 118 only if the data signature SD of the data D matches the reference signature SR. To this end, the interface module 110 may have an input/output memory 126 that is used to buffer-store the data D for calculation of the data signature SD and the comparison before said data are forwarded to the data processing apparatus 100.

Figure 2:
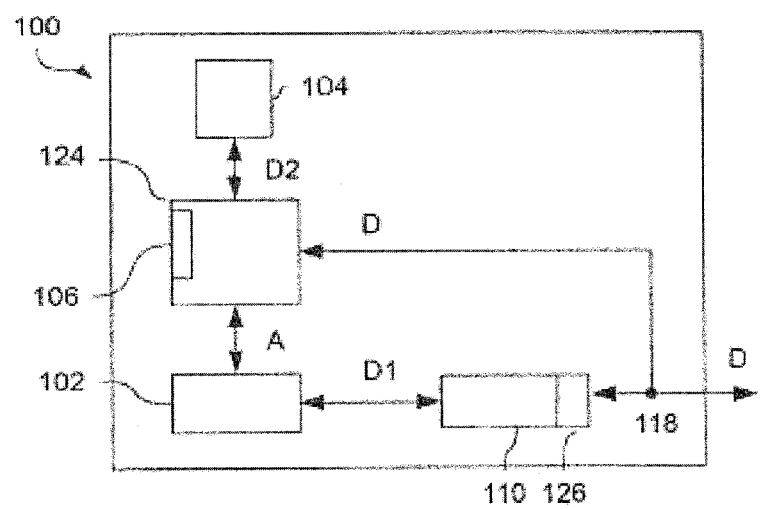

FIG. 2 shows a second embodiment of a data processing apparatus 100. The data processing apparatus 100 may be arranged in a card body, for example, and may be a smart card or a chip card, for example. It may have an input/output port 118 on which data D may be present. The data may be parameters, instructions, commands, commands with parameters, command sequences, command sequences with parameters or programs. They may be used for the data processing apparatus 100 to communicate with the outside world. The data processing apparatus 100 may have a processor 102, a program memory 104, an interface module 110 and a command signature module 124 (code signature module, instruction signature module).

The processor 102 may be coupled to the command signature module 124. It may be coupled to the interface module 110. The command signature module 124 may be coupled to the program memory 104. The input/output port 118 may be coupled to the command signature module 124.

The processor 102 may be a processor 102 as has been described in connection with FIG. 1. It may provide or receive data and/or commands D1 on a port. The data D1 may be conditioned in the interface module 110 for output on the input/output port 118. The interface module 110 may be an interface module 110 as has been described in connection with FIG. 1. It may have an input/output memory or data buffer 126.

The program memory 104 may store data, parameters, instructions, commands, commands with parameters, command sequences, command sequences with parameters or programs, which are subsequently combined under the term "data D2". The data D2 may first of all be forwarded to the command signature module 124 before being supplied to the processor 102. The command signature module 124 may check whether execution or further processing, subsequently combined under the term "handling", of the data D2 by the processor 102 is permitted or admissible.

To this end, the command signature module 124 may have a signature generator, a comparator and a reference signature memory 106 that operate and are connected to one another in a similar or the same way as the signature generator 113, the comparator 114 and the reference signature memory 106 of the data processing apparatus 100 that has been described in connection with FIG. 1. The signature generator may calculate a signature for the data D2 that come from the program memory 104, which signature is subsequently called "data signature SD".

Data, parameters, commands, commands with parameters, command sequences or command sequences with parameters for which execution or further processing by the processor 102 is admissible or permitted are subsequently called "reference data R". Admissible or permitted is intended to mean that the execution or the further processing of the data D2 does not adversely affect the correct functionality of the data processing apparatus 100, for example by virtue of no data that are confidential being output on the input/output port 118.

The reference signature memory 106 may store one or more signatures pertaining to reference data R, subsequently called "reference signature SR". The reference signature SR or a multiplicity of reference signatures SR may be fixed, may be calculated beforehand and may be stored in the reference signature memory 106.

The comparator may be coupled to the signature generator and to the reference signature memory 106, as a result of which it can be supplied with the data signature SD and with the reference signature SR. The comparator can may output an alarm signal A to the processor 102 if the data signature SD does not correspond to one of the stored reference signatures SR. Data D2 from the program memory 104 that have been manipulated in any way, for example by virtue of their content having been altered or fewer or more commands being output, have a different data signature SD than the reference signature SR which means that an attack can be recognized.

When an attack is recognized, the data processing apparatus 100 can then be transferred to a safe state. The processor 102 may be prohibited from executing further commands. Sensitive data, particularly from secret keys that are stored in the data processing apparatus 100, can be erased.

If the data signature SD corresponds to one of the stored reference signatures SR, the processor 102 can handle the data D2, for example continue to use them and execute their commands.

The reference signature can again, for the same reasons as have been cited in connection with the description of FIG. 1, be calculated in real time by the processor 102.

The signatures may be signatures as have been described in connection with FIG. 1.

Since the input/output port 118 is coupled to the command signature module 124, instead of the data D2 from the program memory 104 it is also possible to supply data D that are present on the input/output port 118 to the command signature module 124. The command signature module 124 can then check whether they are permitted or admissible. The reference signatures SR of the permitted or admissible data D on the input/output port 118 can be stored in the reference signature memory 106 of the command signature module 124. Hence, the command signature module 124 can be used not only for checking the data D2 from the program memory 104 but also for checking the data D that are present on the input/output port 118. As described in connection with FIG. 1, it is possible for the output of data D from the data processing apparatus 100 and the input of data to the data processing apparatus 100 to be checked.

The command signature module 124 may to this end have a first operating state and a second operating state. In the first operating state, data D2 that come from the program memory 104 can be monitored. In the second operating state, data D that are present on the input/output port 118 may be monitored. As described in connection with FIG. 1, it is possible for the output of data D on the input/output port 118 by the data processing apparatus 100 and the input of data D on the input/output port 118 to the data processing apparatus 100 to be monitored. The processor 102 may stipulate whether the command signature module 124 is in the first operating state or the second operating state.

When an attack is recognized from the data D, the measures described in connection with FIG. 1 may be taken.

As described in connection with FIG. 1, the data processing apparatus 100 may again be set up such that the data D on the input/output port 118 are routed from the input/output port 118 on to the data processing apparatus 100, for example to the processor 102, only if the data signature SD of the data D matches the corresponding reference signature SR in the reference signature memory 106 in the command signature module 124. The data processing apparatus 100 may also be set up such that the data D are output to the input/output port 118 only if the data signature SD of the data D matches the reference signature SR. To this end, the interface module 110 may have an input/output memory 126 that is used to buffer-store the data D for calculation of the data signature SD and the comparison before they are output on the input/output port 118.

Since the command signature module 124 undertakes the check on the data D, it is possible to dispense with an additional signature generator 113, an additional comparator 114 and an additional reference signature memory 106, as have been described in connection with the input/output module 108 in connection with FIG. 1. When the data processing apparatus 100 is implemented, this allows chip surface area to be saved.

The calculation of the signatures, for example the data signature SD, from data D that are present on the input/output port 118 or from the data D2 that are present on the command signature module 124, or of the reference signatures SR, and the comparison of the data signatures SD with the reference signatures SR and the output of the alarm signal A may be controlled by a piece of operating software in the data processing apparatus 100. When the operating software is written, for example compiled, appropriate commands for the check can be incorporated to this end. The incorporation or insertion of the relevant commands can take place automatically in this case by means of a programming tool. It is also possible for the changeover of the command signature module between the first and second operating modes to be inserted into the operating software.

Although the components of the data processing apparatus 100 have been presented as separate components in the embodiments that have been described in connection with FIG. 1 and FIG. 2, they can also be implemented in integrated form. It is possible to use all protective measures, such as sensors or relevant embodiments, that are used in security microcontrollers.

Various embodiments specify an input/output module, a data processing apparatus and a method for checking the operation of a data processing apparatus that are able to be used to recognize attacks on a chip, for example a security microcontroller.

Various embodiments provide an input/output module, including: at least one input/output port for the input of data; a signature generator that is coupled to the input/output port and is set up to generate a signature for the data from the data; a reference input, wherein the reference input is set up for the application of a reference signature; and a comparator that is coupled to the signature generator and to the reference input, and is set up to output an alarm signal if the signature of the data on the input/output port differs from the reference signature.

In various embodiments, the reference input is coupled to a memory that stores the reference signature.

In various embodiments, the reference input is coupled to a processor, wherein the processor calculates the reference signature.

In various embodiments, the reference signature is a signature from data that are permitted to be output on the input/output port.

In various embodiments, the reference signature is a signature from data that are permitted to be handled by a processor.

In various embodiments, the signature of the data and the reference signature are hash values.

One development further includes an input/output memory, wherein the input/output memory is coupled to the input/output port.

One development further includes an interface module, wherein the interface module is coupled to the input/output port.

In various embodiments, the interface module is a universal asynchronous receiver transmitter, a contactless interface, particularly based on ISO 14443, an $I^2C$ bus, a serial peripheral interface, or a single wire protocol interface.

Various embodiments further provide a data processing apparatus, including a processor and at least one input/ output module described above, wherein the processor is coupled to the input/output module.

One development of the data processing apparatus further includes a command signature module, including a signature generator and a comparator, wherein the signature generator and the comparator of the input/output module are implemented by the signature generator and the comparator of the command signature module.

In various embodiments, the command signature module has a first operating state and a second operating state and is set up to monitor data from a program memory in the first operating state, and to monitor data on the input/output port in the second operating state.

One development further includes a card body, wherein the data processing apparatus is arranged in the card body.

In addition, the invention provides a method for checking the operation of a data processing apparatus, including: calculation of at least one signature for data that are intended to be output by the data processing apparatus on an input/output port or for data that are intended to be input into the data processing apparatus on the input/output port, comparison of the signature of the data with a reference signature, and output of an alarm signal if the signature of the data differs from the reference signature.

In various embodiments, the reference signature is a signature pertaining to data that are permitted to be output via the input/output port.

In various embodiments, the reference signature is a signature pertaining to data that are permitted to be input via the input/output port.

In various embodiments, the reference signature is stored in a memory and is read from the memory for the comparison.

In various embodiments, the reference signature is calculated in real time by a processor while data are present on the input/output port.

In various embodiments, the data are output on the input/output port only if the signature of the data matches the reference signature.

In various embodiments, the data are input into the data processing apparatus on the input/output port only if the signature of the data matches the reference signature.

In various embodiments, output of the alarm signal involves at least one of the following steps being performed: termination of output of data on the input/output port from the data processing apparatus, termination of input of data on the input/output port to the data processing apparatus, transfer of the data processing apparatus to a safe state, and erasure of sensitive data, particularly of secret keys that are stored in the data processing apparatus.

In various embodiments, the calculation of the signature for data that are output or input on the input/output port and the comparison of the signature of the data with a reference signature are performed by a command signature module.

In various embodiments, the command signature module is changed over between the check on data that are output or input on the input/output port and the check on data from a command memory.

In various embodiments, the calculation of the signatures, the comparison of the signatures and the output of the alarm signal are controlled by a piece of operating software in the data processing apparatus.

In various embodiments, the command signature module is changed over by the operating software.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An input/output device configured to verify data prior to input to a processor and/or after output from the processor, comprising:
   at least one input/output port configured for input of data from an external source to the processor and/or output of data from the processor to the external source;
   an interface device configured to input data received at the at least one input/output port to the processor and further configured to output data from the processor to the at least one input/output port, wherein the interface device is coupled to the input/output port; and
   a command signature circuit comprising:
      a signature generator circuit that is coupled to the input/output port and is configured to generate a signature for the data from the data prior to input to the processor from the interface device and/or after output from the processor to the interface device; and
      a comparator circuit that is coupled to the signature generator circuit and is configured to receive a reference signature, and is further configured to output an alarm signal if the signature of the data on the input/output port differs from the reference signature prior to input to the processor and/or after output from the processor,
   wherein the command signature circuit has a first operating state and a second operating state and is configured
      to monitor data from a program memory to verify the data on the input/output port after output from the processor in the first operating state, and
      to monitor data from the input/output port to verify the data on the input/output port prior to input to the processor in the second operating state.

2. The input/output device of claim 1,
   wherein the comparator circuit is coupled to a memory that stores the reference signature.

3. The input/output device of claim 1,
   wherein the comparator circuit is coupled to the processor, wherein the processor calculates the reference signature.

4. The input/output device of claim 1,
   wherein the reference signature is a signature from data that is permitted to be output on the input/output port.

5. The input/output device of claim 1,
   wherein the reference signature is a signature from data that is permitted to be handled by a processor.

6. The input/output device of claim 1,
   wherein the signature of the data and the reference signature are hash values.

7. The input/output device of claim 1, further comprising:
   an input/output memory, wherein the input/output memory is coupled to the input/output port.

8. The input/output device of claim 1,
   wherein the interface device is one of a group consisting of:
      a universal asynchronous receiver transmitter;
      a contactless interface;
      a contactless interface based on ISO 14443;
      an I$^2$C bus;
      a serial peripheral interface; and
      a single wire protocol interface.

9. A data processing apparatus, comprising:
a processor; and
at least one input/output device configured to verify data prior to input to the processor and/or after output from the processor, comprising:
at least one input/output port configured to receive data from an external source and output data to the external source;
an interface device coupled to the input/output port, wherein the interface device is configured to receive data from the at least one input/output port and input the data to the processor and further configured to receive data from the processor and output the data to the at least one input/output port;
a signature generator circuit that is coupled to the input/output port and is configured to generate a signature for the data from the data prior to input to the processor from the interface device and/or after output from the processor to the interface device; and
a comparator circuit that is coupled to the signature generator circuit and is configured to receive a reference signature, and is further configured to output an alarm signal if the signature of the data on the input/output port differs from the reference signature prior to input to the processor and/or after output from the processor;
a command signature circuit, comprising a signature generator circuit and a comparator circuit, wherein the signature generator circuit and the comparator circuit of the input/output device are implemented by the signature generator circuit and the comparator circuit of the command signature circuit;
wherein the command signature circuit has a first operating state and a second operating state and is configured to monitor data from a program memory to verify the data on the input/output port after output from the processor in the first operating state, and to monitor data from the input/output port to verify the data on the input/output port prior to input to the processor in the second operating state; and
wherein the processor is coupled to the at least one input/output device.

10. The data processing apparatus of claim 9, further comprising:
a card body, wherein the data processing apparatus is arranged in the card body.

11. A method for checking the function of a data processing apparatus, the data processing apparatus comprising a processor and an input/output port, the method comprising:
receiving data at the input/output port, wherein the data is configured to be input to the processor from an external source or output from the processor to the external source;
calculating at least one signature for the data after being output from the processor to the input/output port and/or prior to being input to the processor from the input/output port;
comparing the signature of the data with a reference signature; outputting an alarm signal if the signature of the data differs from the reference signature;
wherein the calculating the signature for data that is output or input on the input/output port and the comparing the signature of the data with a reference signature are performed by a command signature circuit; and
changing the command signature circuit from a first operating state to a second operating state, wherein the command signature circuit is configured to monitor data from a program memory to verify the data on the input/output port after output from the processor in the first operating state and to monitor data from the input/output port to verify the data on the input/output port prior to input to the processor in the second operating state.

12. The method of claim 11,
wherein the reference signature is a signature pertaining to data that is permitted to be output via the input/output port.

13. The method of claim 11,
wherein the reference signature is a signature pertaining to data that is permitted to be input via the input/output port.

14. The method of claim 11,
wherein the reference signature is stored in a memory and is read from the memory for comparing the signature of the data with the reference signature.

15. The method of claim 11,
wherein the reference signature is calculated in real time by a processor while data is present on the input/output port.

16. The method of claim 11,
wherein the data is output on the input/output port only if the signature of the data matches the reference signature.

17. The method of claim 11,
wherein the data is input into the data processing apparatus on the input/output port only if the signature of the data matches the reference signature.

18. The method of claim 11,
wherein outputting the alarm signal involves at least one of the following being performed:
terminating outputting data on the input/output port from the data processing apparatus;
terminating inputting data on the input/output port to the data processing apparatus;
transferring the data processing apparatus to a safe state; and
erasing sensitive data that is stored in the data processing apparatus.

19. The method of claim 11,
wherein outputting the alarm signal involves erasing sensitive data of secret keys that is stored in the data processing apparatus.

20. The method of claim 11,
wherein the calculating the signatures, the comparing the signatures and the outputting the alarm signal are controlled by operating software in the data processing apparatus.

21. The method of claim 11,
wherein changing the command signature circuit from a first operating state to a second operating state is controlled by operating software in the data processing apparatus.

* * * * *